(12) United States Patent
Harada et al.

(10) Patent No.: US 9,937,691 B2
(45) Date of Patent: Apr. 10, 2018

(54) LAMINATED TRANSFER MEDIUM AND PRINTED MATTER

(71) Applicant: Toppan Printing Co., Ltd., Taito-ku, Tokyo (JP)

(72) Inventors: Satoshi Harada, Taito-ku (JP); Kazuhiro Yashiki, Taito-ku (JP); Naoki Minamikawa, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 82 days.

(21) Appl. No.: 14/952,098

(22) Filed: Nov. 25, 2015

(65) Prior Publication Data

US 2016/0107430 A1 Apr. 21, 2016

Related U.S. Application Data

(63) Continuation of application No. PCT/JP2014/002893, filed on May 30, 2014.

(30) Foreign Application Priority Data

May 31, 2013 (JP) ................................. 2013-116271

(51) Int. Cl.
*B32B 37/00* (2006.01)
*B44C 1/17* (2006.01)
(Continued)

(52) U.S. Cl.
CPC .............. *B32B 37/025* (2013.01); *B32B 3/30* (2013.01); *B32B 7/12* (2013.01); *B32B 9/00* (2013.01);
(Continued)

(58) Field of Classification Search
None
See application file for complete search history.

(56) References Cited

FOREIGN PATENT DOCUMENTS

DE 10 2007 005 416 A1 7/2008
DE 102007005416 A1 * 7/2008 ............... B44C 1/17
(Continued)

OTHER PUBLICATIONS

Andreas, et al. (DE 102007005416 A1) (Jul. 2008) (EPO machine translation to English).*
(Continued)

*Primary Examiner* — David Sample
*Assistant Examiner* — Donald M. Flores, Jr.
(74) *Attorney, Agent, or Firm* — Foley & Lardner, LLP (57) ABSTRACT

A laminated transfer medium that can be used to make a printed matter or the like which includes a fine relief structure with an improved or even high non-defective rate. The laminated transfer medium can form a transfer laminate which contains a fine relief structure section having a fine relief shape onto a transfer target by using a hot stamp, and characterized in that the laminated transfer medium includes a carrier base, a bonding layer formed on the carrier base, a fine relief structure section having a fine relief shape being disposed on the bonding layer, and an adhesive layer formed on the fine relief structure section, wherein the fine relief structure section is made up of separate discrete pieces positioned to be contained in area to be transferred by using the hot stamp.

7 Claims, 8 Drawing Sheets

(51) Int. Cl.
  B32B 3/30 (2006.01)
  B32B 7/12 (2006.01)
  B32B 9/00 (2006.01)
(52) U.S. Cl.
  CPC ............ *B44C 1/17* (2013.01); *B32B 2307/75* (2013.01); *B32B 2551/00* (2013.01)

(56) References Cited

FOREIGN PATENT DOCUMENTS

| EP | 0688840 | A2 | | 12/1995 | |
|----|---------|----|----|---------|----|
| JP | S61-98751 | A | | 5/1986 | |
| JP | S63-23909 | A | | 2/1988 | |
| JP | S63-23910 | A | | 2/1988 | |
| JP | 2524092 | Y2 | | 11/1996 | |
| JP | 2000-211927 | A | | 8/2000 | |
| JP | 2000-263994 | A | | 9/2000 | |
| JP | 2006-312266 | A | | 11/2006 | |
| JP | 2006312266 | A | * | 11/2006 | ............ B32B 7/02 |
| JP | 2007-118563 | A | | 5/2007 | |
| JP | 4088884 | B2 | | 5/2008 | |
| JP | 4194073 | B2 | | 12/2008 | |
| WO | WO-93/17060 | A1 | | 9/1993 | |
| WO | WO-96/20968 | A1 | | 7/1996 | |
| WO | WO-96/40813 | A1 | | 12/1996 | |
| WO | WO-97/31073 | A1 | | 8/1997 | |
| WO | WO-98/53013 | A1 | | 11/1998 | |
| WO | WO-2004/031256 | A1 | | 4/2004 | |
| WO | WO-2005/035613 | A1 | | 4/2005 | |

OTHER PUBLICATIONS

Toshiya, et al. (JP 2006-312266 A) (Nov. 2006) (EPO machine translation to English).*
Extended European Search Report issued in EP Patent Application No. 14803805.2 dated Dec. 14, 2016.
International Search Report issued in PCT/2014/002893 dated Sep. 2, 2014.
Wohler (1927), "An Apparatus for Determining Both the Quantity of Gas Evolved and the Amount of Reagent Consumed in Reactions with Methyl Magnesium Iodide", Journal of the American Chemical Society, vol. 49, p. 3181.

* cited by examiner

Fig. 6A pressurized and bonded

Fig. 6B peeled off

Fig. 8A pressurized and bonded

Fig. 8B peeled off

Fig. 8C

LAMINATED TRANSFER MEDIUM AND PRINTED MATTER

CROSS-REFERENCE TO RELATED PATENT APPLICATIONS

This application is a continuation application filed under 35 U.S.C. 111(a) claiming the benefit under 35 U.S.C. § § 120 and 365(c) of PCT International Application No. PCT/JP2014/002893 filed on May 30, 2014, which is based upon and claims the benefit of priority of Japanese Application No. 2013-116271, filed on May 31, 2013, the entire contents of them all are hereby incorporated by reference.

TECHNICAL FIELD

The present invention relates to a laminated transfer medium and a printed matter, and more specifically, to a laminated transfer medium used for thermal transfer of a printed matter having a transfer laminate which contains a fine relief structure by using a hot stamp.

BACKGROUND

Continuous mass production of a fine relief pattern on a laminated transfer medium has been typically performed using techniques such as "press method" as described in PTL 1, "casting method" as described in PTL 2 and "photopolymer method" as described in PTL 3.

In manufacturing a fine relief structure by the "press method," a resin layer on which the fine relief structure is formed is heated to a softening temperature or more, and is pressed against a relief mold (reproduction mold of the fine relief structure) to transfer the shape of the fine relief structure. In another technique, the relief mold which is heated to a softening temperature of the resin layer or more is pressed against the resin layer to transfer the shape of the fine relief structure. In either of those cases, the resin layer on which the fine relief structure is formed needs to have a processing temperature which is higher than the softening temperature. Further, the formed fine relief structure has a heat resistant temperature which is substantially the same as the minimum processing temperature.

Accordingly, in order to obtain the fine relief structure having high heat resistance, it is necessary to use a resin having a desired heat resistant temperature or more and mold the structure at a processing temperature of a desired heat resistant temperature or more. Consequently, a large amount of heat energy is required, which decreases the processing speed and the productivity.

In manufacturing of a fine relief structure by a "casting method," a resin on which the fine relief structure is formed is heated to a melting temperature or more, and is melted and extruded onto a relief mold (reproduction mold of the fine relief structure) to transfer the shape of the fine relief structure. After the resin is cooled and has lower fluidity, it is peeled off from the relief mold.

Also in this case, the resin on which the fine relief structure is formed needs to have a processing temperature which is higher than the softening temperature. Further, the molded fine relief structure has a heat resistant temperature which is substantially the same as the minimum processing temperature.

The "photopolymer method" (2P method, photosensitive resin method) is described, for example, in PTL 3. A highly accurate fine relief pattern can be obtained by injecting a radiation curable resin into a cavity between the "relief mold" (reproduction mold of the fine relief pattern) and the "flat base" (such as plastic film), allowing it to cure by radiation, and peeling the cured film along with the base from the "relief mold".

Optical elements obtained by this method have a relief pattern forming accuracy, heat resistance, and chemical resistance higher than those formed by "press method" or "casting method" which uses a thermoplastic resin. Further, since a radiation curable resin in a liquid form is used, a heat energy during processing is not necessary.

Figure 7:
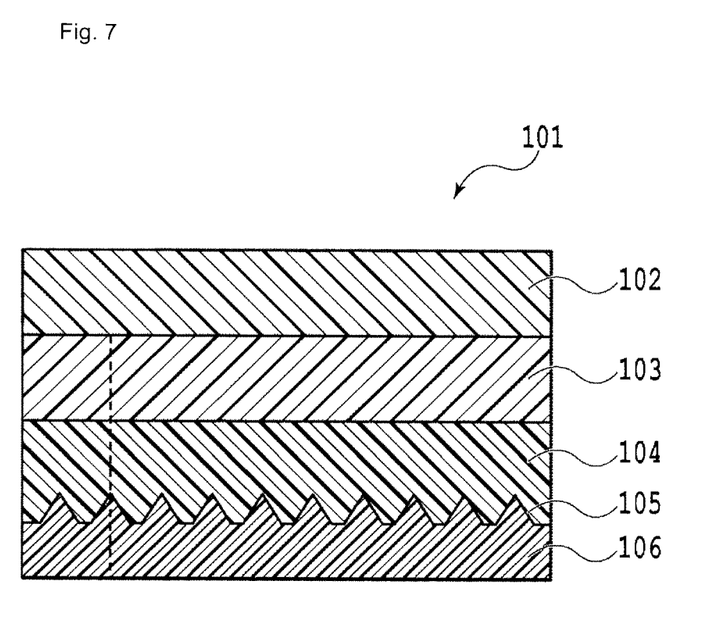
FIG. 7 is a schematic cross sectional view for explaining a problem of a conventional laminated transfer medium.

However, those forming methods, that is, "press method," "casting method" and "photopolymer method" have a problem. The problem is described with reference to FIG. 7. In FIG. 7, reference number 101 denotes a laminated transfer medium. The laminated transfer medium 101 includes a carrier base 102, a bonding layer 103, a fine relief structure forming layer 104, a reflection layer 105 and an adhesive layer 106, which are stacked on the carrier base 102 in this order.

In the forming method using the laminated transfer medium 101, the fine relief structure forming layer 104 made of a resin for forming a transfer area which contains a fine relief structure on a transfer target is a continuous layer as shown in FIG. 7. Accordingly, in a transferring process of the laminated transfer medium 101 by using a hot stamp, a portion of the fine relief structure forming layer 104 to be transferred is cut off by melting so that a desired fine relief structure is transferred onto the transfer target via the adhesive layer 106. Since the breakability of the laminated transfer medium 101 which includes the fine relief structure forming layer 104 depends on a breaking strength of the resin used for the fine relief structure forming layer 104, transfer burrs or transfer defect occurs during thermal transfer, for example, at a position indicated by the dotted line in FIG. 7, leading to lowering of non-defective rate.

Figure 8A:
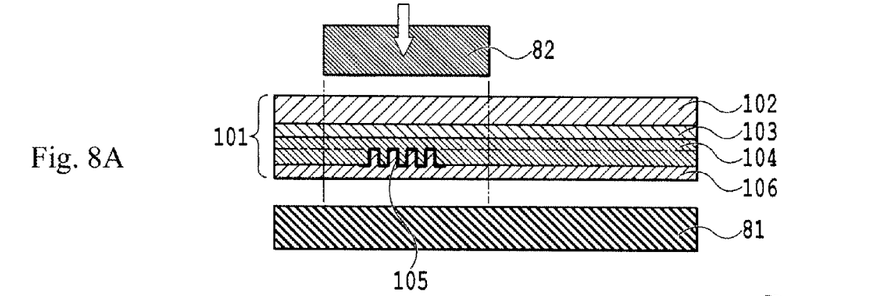
FIGS. 8A-8C are a schematic cross sectional view for explaining transfer by using the conventional laminated transfer medium.
Figure 8B:
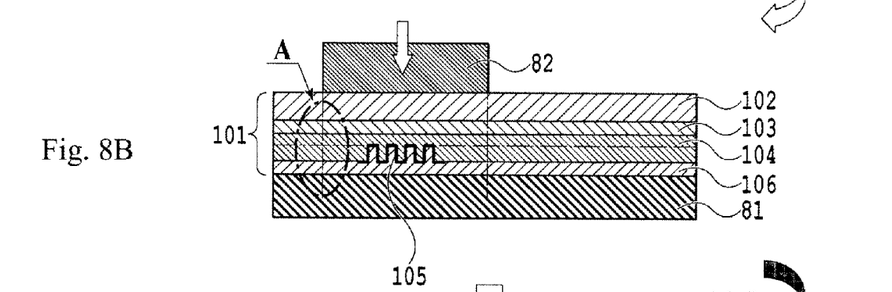
Figure 8C:
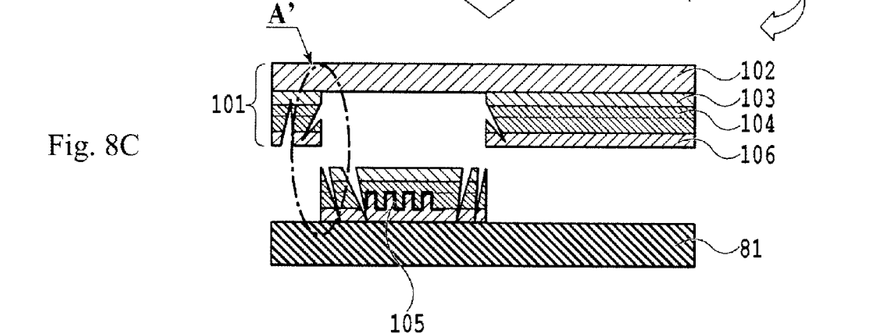

FIGS. 8A-8C show that transfer burrs or transfer defect occurs during transfer using the conventional laminated transfer medium 101. That is, transfer burrs or transfer defect occurs in the vicinity of an interface between a pressurized bonded area and a non-pressurized area which is indicated by A in FIGS. 8A-8C during a peeling process as indicated by A' in FIGS. 8A-8C.

CITATION LIST

Patent Literature

[PLT 1] JP-B-4194073
[PLT 2] JP-UM-B-2524092
[PLT 3] JP-B-4088884
[PLT 4] JP-A-2000-211927

SUMMARY OF THE INVENTION

Technical Problem

The present invention has been made to attempt to overcome the above problem, and has as an object to provide a laminated transfer medium which includes a fine relief structure section made up of separate discrete pieces positioned to be contained in an area to be transferred by using the hot stamp, and has good transfer capability without being effected at least in part by a heat resistance or breakability such as hardness or flexibility of the resin used for the fine relief structure section.

Further, it is preferable that the fine relief structure section is covered by an adhesive layer and a filling section made of the same resin as that of the adhesive layer. Accordingly, even if the fine relief structure section is made of a resin having high hardness, cracking of the fine relief structure section due to a pressure difference between a pressurized area and non-pressurized area during hot stamping is prevented since the resin having high hardness is used only for an optical structure portion.

Further, it is preferable that a resin used for the fine relief structure section or the adhesive layer has a high elongation ratio and flexibility. Accordingly, even if the optical element is required to have high impact resistance, the occurrence of transfer burr during transfer is prevented since the resin having high flexibility is used only for an optical structure.

Solution to Problem

A laminated transfer medium according to the present invention that forms a transfer laminate which contains a fine relief structure section having a fine relief shape onto a transfer target by using a hot stamp, characterized in that the laminated transfer medium includes:

a carrier base;
a bonding layer formed on the carrier base;
the fine relief structure section having the fine relief shape being disposed on the bonding layer; and
an adhesive layer formed on the fine relief structure section, wherein the fine relief structure section is made up of separate discrete pieces positioned to be contained in area to be transferred by using the hot stamp.

Advantageous Effects of Invention

The present invention can provide a laminated transfer medium which includes a fine relief structure section made up of separate discrete pieces positioned to be contained in area to be transferred by using the hot stamp, and has good breakability without being affected by a heat resistance or breakability such as hardness of the resin used for the fine relief structure section so as to prevent occurrence of transfer burrs or transfer defect in the fine relief structure section during thermal transfer and improve a non-defective rate.

Further, it is preferable that the fine relief structure section is covered by an adhesive layer and a filling section made of the same resin as that of the adhesive layer. Accordingly, even if the fine relief structure section is made of a resin having high hardness, cracking of the fine relief structure section can be prevented.

Further, it is preferable that a resin used for the fine relief structure section or the adhesive layer has a high elongation ratio and flexibility. Accordingly, even if the optical element is required to have high impact resistance, the occurrence of transfer burrs during transfer can be prevented since the resin having high flexibility is used only for an optical structure.

DESCRIPTION OF EMBODIMENTS

With reference to the drawings, some embodiments will be described in detail.

Figure 1:
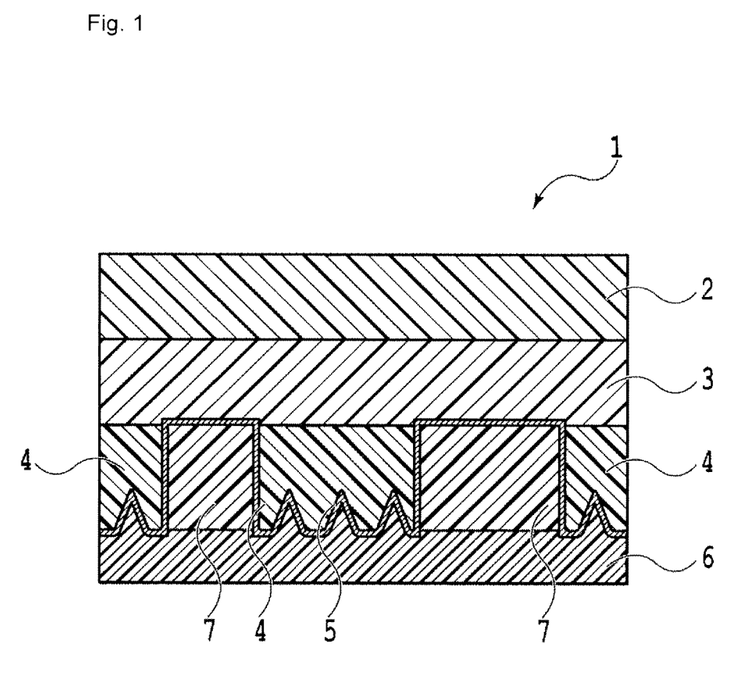
FIG. 1 is a schematic cross sectional view which shows a laminated transfer medium according to an embodiment.

FIG. 1 is a schematic cross sectional view which shows a configuration of a laminated transfer medium according to an embodiment. A laminated transfer medium 1 includes a carrier base 2, a bonding layer 3, a fine relief structure section 4 having fine relief shape made up of separate discrete pieces positioned to be contained in area to be transferred by using a hot stamp, a reflection layer 5 and an adhesive layer 6, which are stacked on the carrier base 2 in this order.

The laminated transfer medium according to an embodiment can be manufactured by using a forming film on which a mold that corresponds to a fine relief structure section is formed. That is, forming resin ink is applied on a partial area of the surface of the mold of the forming film to form the fine relief structure section. Then, the fine relief structure section is transferred on a bonding layer of a transfer carrier base so that the fine relief structure section made up of separate discrete pieces is formed. Then, a reflection layer is vapor deposited on the fine relief structure section, and an adhesive is further applied thereon so that an adhesive layer and a filling section are formed.

That is, the fine relief structure section 4 is not formed as a continuous layer on the surface of the bonding layer 3, but is formed as the fine relief structure section as a whole which is made up of one or a plurality of discrete pieces spaced from one another by a desired space.

Since the fine relief structure section 4 is made up of separate discrete pieces to be contained in area to be transferred, the outer periphery of the fine relief structure section to be transferred can be transferred inside the outer periphery of the area to be transferred by using a hot stamp.

A filling section 7 is provided in the fine relief structure section 4. The filling section 7 is made of the same material as that of the adhesive layer 6. The term "in the fine relief structure section 4" as described herein means a portion between discrete pieces of the fine relief structure section when the fine relief structure section is made up of a plurality of discrete pieces, and an adjacent portion on the right and left sides of the fine relief structure section when the fine relief structure section is made up of a single piece.

The reflection layer 5 is formed on the surface of the bonding layer 3 including the surface of the fine relief structure section 4.

Figure 2:
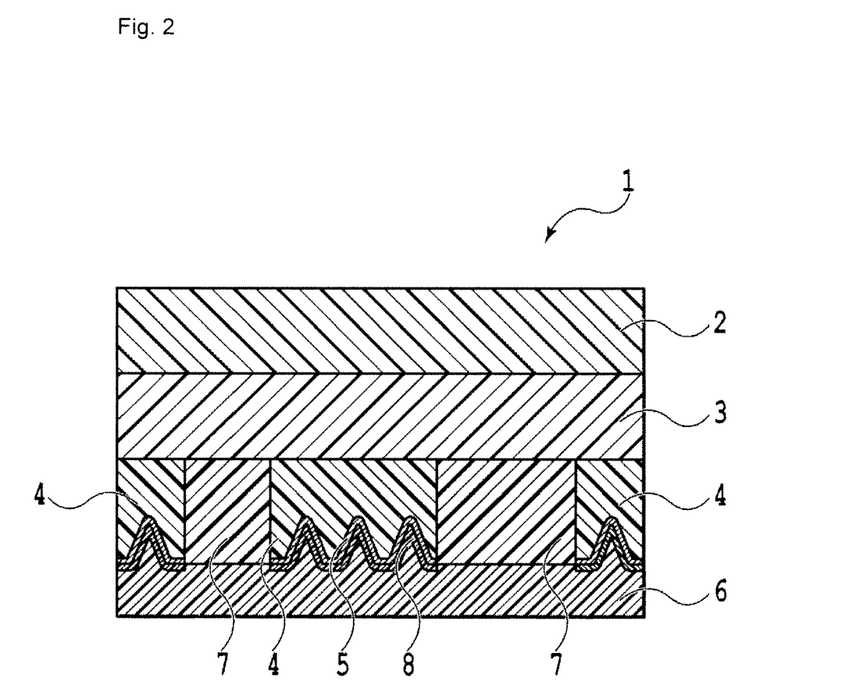
FIG. 2 is a schematic cross sectional view which shows another laminated transfer medium according to an embodiment.

FIG. 2 is a schematic cross sectional view which shows a configuration of another laminated transfer medium according to the embodiment. The laminated transfer medium 1 includes the carrier base 2, the bonding layer 3, the fine relief structure section 4 made up of separate discrete pieces positioned to be contained in area to be transferred by using a hot stamp, the reflection layer 5, a mask layer 8 and the adhesive layer 6, which are stacked on the carrier base 2 in this order. The reflection layer 5 is formed on the relief surface of the fine relief structure section 4, and the mask layer 8 is formed on the reflection layer 5. That is, on the reflection layer 5 as shown in FIG. 1, the mask layer 8 is formed on a portion of the reflection layer 5 which corresponds to the relief surface of the fine relief structure section 4 as shown in FIG. 2, and an exposed portion of the reflection layer 5 is selectively removed by using the mask layer 8 as a mask. Accordingly, the reflection layer 5 and the mask layer 8 are arranged as shown in FIG. 2.

The aforementioned layers shown in FIGS. 1 and 2 will be described in detail.

(Carrier Base)

In FIGS. 1 and 2, the carrier base 2 is preferably a film base. The film base may be made of a plastic film such as PET (polyethylene terephthalate), PEN (polyethylene naphthalate) and PP (polypropylene). In particular, the film base preferably has heat resistance which does not cause deformation or alteration by heat energy applied during curing and transfer.

The surface of the carrier base 2 which faces the bonding layer 3 is preferably treated to enhance detachability.

(Bonding Layer)

In FIGS. 1 and 2, the bonding layer 3 is used for smooth transfer of the fine relief structure section 4 during thermal transfer. The bonding layer 3 is preferably made of an adhesive resin. The adhesive resin may be thermoplastic resin such as polyester-based resin, acryl-based resin, vinyl chloride-based resin, vinyl-based resin, polyamide-based resin, polyvinyl acetate-based resin, rubber-based resin, ethylene-vinyl acetate copolymer-based resin, and vinyl chloride acetate copolymer-based resin. The bonding layer 3 preferably has a thickness of 1-20 μm.

The bonding layer 3 is made of a material which also serves as a peeling layer during transfer.

(Fine Relief Structure Section)

In FIGS. 1 and 2, the fine relief structure section 4 may be used for a back light, diffusing plate or anti-reflection film for a Fresnel lens plate, lenticular plate and liquid crystal device used for a relief hologram, grating, sub-wavelength grating, microlens, polarizer, screen and the like.

The fine relief structure section 4 may be made of a material such as thermoplastic resin, thermosetting resin, oxidative polymerization resin, reactive curing type resin, and UV or EB curing resin. For example, thermoplastic resin may include acryl-based resin, epoxy-based resin, cellulose-based resin, polyester-based resin, vinyl-based resin, rubber-based resin, polyamide-based resin, polyimide-based resin, polycarbonate-based resin, liquid crystal and the like.

(Forming of Fine Relief Structure Section)

The fine relief structure section can be formed by the following method, for example, by using a forming film on which a mold which corresponds to the fine relief structure section is formed.

The fine relief structure section is formed by applying a forming resin ink on a partial area of the surface on which the mold of the forming film is formed. Then, the fine relief structure section is transferred on the bonding layer of the transfer carrier base so that the fine relief structure section made up of separate discrete pieces is formed.

In the above forming method, the resin used for the fine relief structure section is preferably urethane resin or epoxy resin which gradually cures at room temperature.

Urethane resin is usually synthesized by reaction of an isocyanate-reactive compound and diisocyanate which is a bifunctional isocyanate. Further, a functional group such as carboxy group and amino group may also be used so that a variety of products of different properties can be manufactured.

The term isocyanate-reactive compound as described herein includes any organic compound which contains at least two types of isocyanate-reactive component of the active hydrogen-containing compound or the like, or imino functional compounds. The active hydrogen-containing component is a component containing at least one hydrogen atom, and the hydrogen atom shows significant activity depending on the position in a molecule according to the Zerewitinoff test as described in "Journal of the American Chemical Society, Vol. 49, p. 3181 (1927)" by Wohler. Examples of an active hydrogen component are —COOH, —OH, —NH2, —NH—, —CONH2, —SH, and —CONH—. Preferable active hydrogen-containing compounds may include polyol, polyamine, poly mercaptan and polyacid. Desirable imino functional compounds contain at least one terminal imino group per molecule. The isocyanate-reactive compound is preferably a polyol, and more preferably, polyether polyol.

Desirable polyols include compounds which contain at least two hydroxyl groups. Those may include monomer, oligomer, polymer, and mixture thereof. Examples of hydroxy functional oligomers and monomers include castor oil, trimethylolpropane and diols, as well as branched-chain diols such as 2-butyl ethyl-1,3-propane diol as described in WO 98/053013.

Examples of desirable polymers include polyester polyols, polyacrylate polyols, polycarbonate polyols, polyurethane polyols, melamine polyols, and mixtures or compounds thereof. Those polymers are generally known by a person having ordinary skill in the art and commercially available. Examples of desirable polyester polyols, polyacrylate polyols, and mixtures thereof are described, for example, in WO 96/20968 and EP 0688840. Examples of desirable polyurethane polyols are described in WO 96/040813.

The hydroxy functional epoxy resin, alkyd and dendrimeric polyol include, for example, those described in WO 93/17060. Coating compound composition may include latent hydroxy functional compounds such as bicyclic ortho ester group, spiro ortho ester group, spiro orthosilicates group, or bicyclic amide acetal compound. Those compounds and uses thereof are described in WO 97/31073, WO 2004/031256 and WO 2005/035613.

The fine relief structure section may include a metal based catalyst for addition reaction of isocyanate group and isocyanate-reactive compound. Such a catalyst is known to a person having ordinary skill in the art. The amount of catalyst used is generally 0.001 to 10% by weight, preferably 0.002 to 5% by weight, and more preferably 0.01 to 1% by weight per nonvolatile substance in the coating composition. Desirable metals in the metal based catalyst include zinc, cobalt, manganese, zirconium, bismuth and tin. Examples of a coating composition preferably includes tin based catalyst. Known examples of the tin based catalyst include dimethyl tin dilaurate, dimethyl tin diversatate, dimethyl tin dioleate, dibutyl tin dilaurate, dioctyl tin dilaurate and tin octoate.

Epoxy resin is a general term for thermosetting resins capable of curing by graft polymerization of an epoxy group contained in polymer, and can be obtained in a thermosetting process from a mixture of prepolymer before graft polymerization and hardener.

Prepolymer compositions may be various, and is most typically a copolymer of bisphenol A and epichlorohydrin. Various types of polyamines or acid anhydrides may be used for hardener.

Examples of alicyclic epoxy compound include, but are not limited to, 2-(3,4-epoxy)cyclohexyl-5,5-spiro-(3,4-epoxy)cyclohexane-m-dioxane, 3,4-epoxy cyclohexyl-3',4'-epoxy cyclohexane carboxylate (EECH), 3,4-epoxy cyclohexyl alkyl-3',4'-epoxy cyclohexane carboxylate, 3,4-epoxy-6-methylcyclohexyl methyl, 3',4-epoxy-6'-methylcyclohexane carboxylate, vinylcyclohexane dioxide, bis(3,4-epoxy cyclohexyl methyl) adipate, bis(3,4-epoxy-6-methylcyclohexyl methyl) adipate, exo-exobis(2,3-epoxycyclopentyl)ether, endo-exobis(2,3-epoxycyclopentyl)ether, 2,2-bis(4-(2,3-epoxypropoxy)cyclohexyl)propane, 2,6-bis(2,3-epoxypropoxy cyclohexyl-p-dioxane(dioxane), 2,6-bis(2,3-epoxypropoxy)norbonene, the diglycidylether of linoleic acid dimer, limonene dioxide, 2,2-bis(3,4-epoxy cyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxy hexahydro-4,7-methanoindane, o-(2,3-epoxy) cyclopentenylphenyl-2,3-epoxypropyl ether), 1,2-bis[5-(1,2-epoxy)-4,7-hexahydrometanoindanoxyl]ethane, cyclopentenylphenyl glycidyl ether, cyclohexanediol diglycidyl ether, diglycidyl hexahydrophthalate, and mixtures thereof.

Examples of aromatic epoxy resin include, but are not limited to, bisphenol-A epoxy resin, bisphenol-F epoxy resin, phenol novolac epoxy resin, cresol novolac epoxy resin, biphenol epoxy resin, biphenyl epoxy resin, 4,4'-biphenyl epoxy resin, divinylbenzene dioxide resin, 2-glycidyl phenyl glycidyl ether resin, and mixture thereof.

Examples of hardener that is hardened with epoxy prepolymer include, but are not limited to, maleic anhydride, acid anhydrides such as maleic anhydride copolymer, amine compounds such as dicyandiamide, and phenol compounds such as phenol novolac and cresol novolac. Further, an epoxy resin curing accelerator may be used, and examples thereof include, but are not limited to, imidazoles and derivatives thereof, tertiary amines and quaternary ammonium salts.

(Forming of Fine Relief Structure Section Using Light Curing Material)

The fine relief structure section can be formed by a radiation curable resin.

Examples of radiation curable resin may include monomers, oligomers and polymers having ethylenic unsaturated bond. Examples of such monomers may include 1,6-hexane diol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Examples of such oligomers may include epoxy acrylate, urethane acrylate, and polyester acrylate. Examples of such polymers may include urethane modified acryl resin, and epoxy-modified acryl resin.

Other examples of light curing resin may include those described in JP-A-S61-98751, JP-A-S63-23909, JP-A-S63-23910, JP-A-2007-118563. Non-reactive polymers such as acryl resin, polyester-based resin, urethane resin and epoxy resin may be added in order to accurately form the fine relief pattern shape.

Examples of those using photocationic polymerization may include monomers, oligomers, polymers having an epoxy group, oxetane ring-containing compounds, and vinylethers. When those ionizing radiation curable resins are cured by light such as UV light, a photo polymerization initiator may be added. Photo-radical polymerization initiator, photo-cationic polymerization initiator, and a combination (hybrid) thereof may be selected depending on the resin.

Examples of a photo-radical polymerization initiator may include benzoin based compounds such as benzoin, benzoin methyl ether and benzoin ethyl ether, anthraquinone based compounds such as anthraquinone and methyl anthraquinone, phenyl ketone based compounds such as acetophenone, diethoxy acetophenone, benzophenone, hydroxyacetophenone, 1-hydroxycyclohexyl phenyl ketone, α-amino acetophenone, and 2-methyl-1-(4-methylthiophenyl)-2-morpholino propane-1-on, benzyl dimethyl ketal, thioxanthone, acylphosphine oxide and Michler's ketone.

Examples of a photo-cationic polymerization initiator in using compounds capable of photo-cationic polymerization may include aromatic diazonium salts, aromatic iodonium salts, aromatic sulfonium salts, aromatic phosphonium salts, and mixed ligand metal salts. For hybrid type materials that use photo-radical polymerization and photo-cationic polymerization, the initiators can be used in mixture. Aromatic iodonium salts, aromatic sulfonium salts and the like, which are initiators capable of initiating both polymerizations, may also be used.

The fine relief structure section can be obtained by adding photo polymerization initiator by 0.1 to 15% by weight to a radiation curable resin. For resin compositions, sensitizing dye may be used in combination with photo polymerization initiator. If necessary, dyes, pigments, various additives (such as polymerization inhibitor, leveling agent, defoaming agent, anti-drip agent, adhesion promoting agent, coating surface modification agent, plasticizer, nitrogen-containing compound), cross-linking agents (for example, epoxy resin) may be used. Non-reactive resin may be added to improve formability.

The thickness of the fine relief structure section may be selected as appropriate in the range of 0.1 to 10 μm.

Although depending on the viscosity (fluidity) of uncured coating, the thickness of the fine relief structure section 4 which is over 10 μm may cause overflow or creases of resin of the uncured coating during pressing process. When the fine relief structure section has an extremely small thickness, sufficient formation becomes difficult.

Since the forming ability varies depending on the shape of the fine relief structure of the original plate, the fine relief structure section preferably has a thickness 3 to 10 times of a desired thickness.

In forming the fine relief structure forming section, print method may be preferably used for forming the separate and discrete structures. Particularly, gravure printing method can provide low cost printing. Further, in order to adjust coating thickness, coating may be diluted with solvent and dried.

Further, in forming the fine relief structure section, urethane resins, melamine resins, phenol-based resins or the like which are acryl polyols, polyester polyols or the like having reactive hydroxyl group with polyisocyanate being added as additive may be used. UV or EB curable resins may include epoxy(meta)acryl, urethane(meta)acrylate, or the like, and preferably have a thickness in 0.5 to 5.0 μm.

In forming the fine relief structure section, besides the aforementioned resins, resin materials including metals such as aluminum and silver, inorganic oxides such as silica and mica, magnetic substances such as magnetite may be used.

(Filling Section)

As shown in FIGS. 1 and 2, the filling section 7 is provided in the fine relief structure section 4. When only the compressed part is peeled from the carrier base by applying thermocompression, the filling section 7 can prevent burrs from being formed even if the fine relief structure section 4 is made of a rigid material having low breakability.

(Reflection Layer)

In FIGS. 1 and 2, examples of materials of the reflection layer 5 may include individual metal materials such as Al, Sn, Cr, Ni, Cu, Au, Ag, and a compound thereof. The reflection layer preferably has a thickness in 100 Å to 3000 Å.

The reflection layer 5 may be made of a transparent material, examples of which are as described below, where numerical values in parentheses following the chemical formula or compound represent refractive indexes n. Examples of ceramics may include Sb2O3(3.0), $Fe_2O_3$(2.7), $TiO_2$(2.6), CdS(2.6), CeO2(2.3), ZnS(2.3), PbCl2(2.3), CdO (2.2), Sb2O3(5), WO3(5), SiO(5), Si2O3(2.5), In2O3(2.0), PbO(2.6), Ta2O3(2.4), ZnO(2.1), ZrO2(5), MgO(1), Si2O2 (10), MgF2(4), CeF3(1), CAF2(1.3-1.4), AlF3(1), $Al_2O_3$(1), GaO(2) and the like. Examples of organic polymers may include polyethylene(1.51), polypropylene (1.49), polytetrafluoroethylene(1.35), polymethylmethacrylate (1.49), polystyrene (1.60) and the like. Those materials are selected depending on an optical properties such as refractive index, reflection index and transmission index, weather resistance, and adhesiveness between layers, and are formed in the shape of films.

The forming method of the reflection layer 5 may use known methods as appropriate such as vacuum deposition method, sputtering method, and CVD method which can control the film thickness, film forming speed, the number of layers, and optical film thickness. In addition, high brightness ink in which minute particles of those materials are dispersed in various solvents may be applied.

Examples further include high bright light reflection ink in which fine powders, sol or metal nano particles of the above metals, ceramics or organic polymers are dispersed in organic polymer resins, organic polymers and minute particles of organic polymers. In this case, although care should be taken not to allow the solvent to attack the fine relief structure section 4, known printing methods such as gravure printing method, flexography printing, screen printing method can be used. When the reflection layer 5 is formed by such printing method, the thickness after drying may be adjusted in the order of 0.001 to 10 μm.

The reflection layer 5 may be partially formed. In this case, paster processing, washed celite processing, or laser processing may be used. In addition, for example, reflection layer of fine Sea-island structure may be formed by vacuum deposition of tin or the like.

In forming a transparent reflection layer, the effect of optical element in transmission may be used with a transmission rate of 20% or more in a wavelength area of 400 nm to 700 nm. Further, print information of the information underlies the reflection layer, for example, facial image, characters, pattern or the like can be recognized.

(Mask Layer)

In FIG. 2, the mask layer 8 may be disposed between the reflection layer 5 and the adhesive layer 6 so as to cover the reflection layer 5, and immersed, for example, in alkaline solution to partially etch the reflection layer 6.

The mask layer 8 may be formed of, for example, thermoplastic resins such as polyamide-based resin, polyimide-based resin, vinyl-based resin, or UV-curable resist.

(Adhesive Layer)

In FIGS. 1 and 2, the adhesive layer 6 may be made of thermoplastic resins such as polyester-based resin, acryl-based resin, vinyl chloride resin, vinyl-based resin, polyamide-based resin, polyvinyl acetate-based resin, rubber-based resin, ethylene-vinyl acetate copolymer-based resin, and vinyl chloride acetate copolymer-based resin.

Further, thermosetting resins may also be used as long as it is flexible, examples of which include flexible epoxy resin, and flexible urethane resin. It is possible to impart flexibility to curable resins by a method of adding plasticizer to curable resins, or incorporating an elastic structure of flexible urethane framework or rubber into framework of curable resins.

Indexes of flexibility may include elongation ratio, tensile stress, tensile elasticity and the like. For example, elongation ratio is preferably 5% or more, and more preferably, 20% or more in a test method under ISO 527 using an ISO 3167 test piece (100 μm thickness). Coating the fine relief structure section 4 with such a flexible resin may improve impact resistance of the fine relief structure section 4.

The adhesive layer 6 may be formed by applying the above resin by a gravure coat, lip coat, microgravure coat, or extruder.

Further, the adhesive layer 6 preferably has a thickness in 1 to 20 μm.

Coloring process can be performed by adding dye or pigment in any of the layers of the carrier base 2, the bonding layer 3, the fine relief structure section 4, the reflection layer 5, the mask layer 8 and the adhesive layer 6. Alternatively, materials excited with UV or IR light may be added to provide an effect visually recognizable by visual or mechanical detection in a specific wavelength range.

With reference to schematic cross sectional views of FIGS. 3 and 4, an example of manufacturing method of the fine relief structure section according to an embodiment will be described.

A forming film 56 for forming the fine relief structure section is unwound from a forming film feed roll 51. As shown in FIG. 4, a resin layer of a mold structure having an inverted shape of the fine relief structure section shown in FIGS. 1 and 2 is formed on one surface (underside) of the forming film 56. The forming film 56 is fed between a forming resin ink applying cylinder 52 and a forming resin ink pressurizing cylinder 53 with the underside facing the applying cylinder 52. In doing so, since the applying cylinder 52 rotates while being immersed in a forming resin ink 55 in a forming resin ink container 54 as shown in FIG. 3, the forming resin ink is applied in a patterned shape on one surface (underside) of the forming film 56 as shown in FIG. 4. Accordingly, as shown in FIG. 4, the forming resin ink applied on the applying cylinder 52 is transferred to the resin layer of the forming film 56 so that uncured fine relief structure section is formed. Then, a fine relief structure section-forming forming film 57 is transported to a forming resin ink curing section 58, and uncured forming resin ink of the fine relief structure section cures into a film in the forming resin ink curing section 58 so that the fine relief structure section is formed.

Meanwhile, the bonding film 66 for transferring the fine relief structure section is unwound from a bonding film feed roll 61, and is fed between a bonding ink applying cylinder 62 and a bonding ink pressurizing cylinder 63. In doing so, since the applying cylinder 62 rotates while being immersed in a bonding ink 65 in a bonding ink container 64, the bonding ink is applied on the entire periphery of the applying cylinder 62. Accordingly, the bonding ink 65 is transferred from the applying cylinder 62 to the bonding film 66 so that the bonding ink layer is formed on the bonding film 66. Then, the bonding ink layer-forming bonding film 67 is transported to a bonding ink curing section 68, and the bonding ink layer cures into a film in the bonding ink curing section 68.

Then, the fine relief structure section-forming forming film 57 and the bonding ink layer-forming bonding film 67 are brought into contact with each other by a pair of bonding cylinders 59, 69 and heated as necessary so that the fine relief structure section of the forming film 57 is transferred to the bonding ink layer of the bonding film 67. After that, the forming film 56 having the resin layer on which the mold structure is formed is peeled off in a film peeling section 71 shown in FIG. 3, and wound around a take-up roll 60. Meanwhile, the bonding film 67 on which the fine relief structure section is transferred to the bonding ink layer is wound around a take-up roll 70.

Details of the materials used in the manufacturing method of FIGS. 3 and 4, and forming of the fine relief structure will be described below.

(Forming Film)

Figure 3:
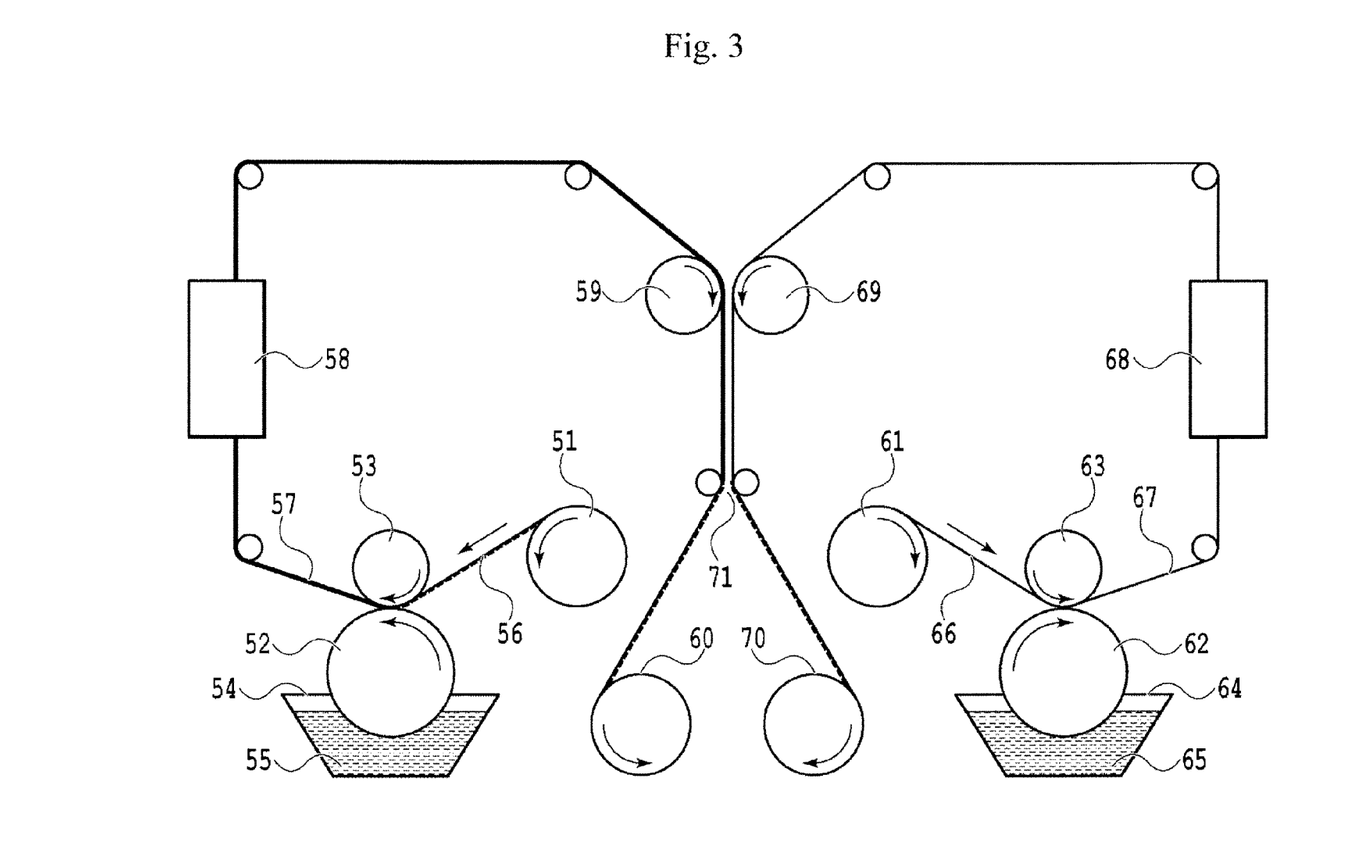
FIG. 3 is a schematic cross sectional view which shows an example of manufacturing method of a fine relief structure section of the laminated transfer medium according to an embodiment.
Figure 4:
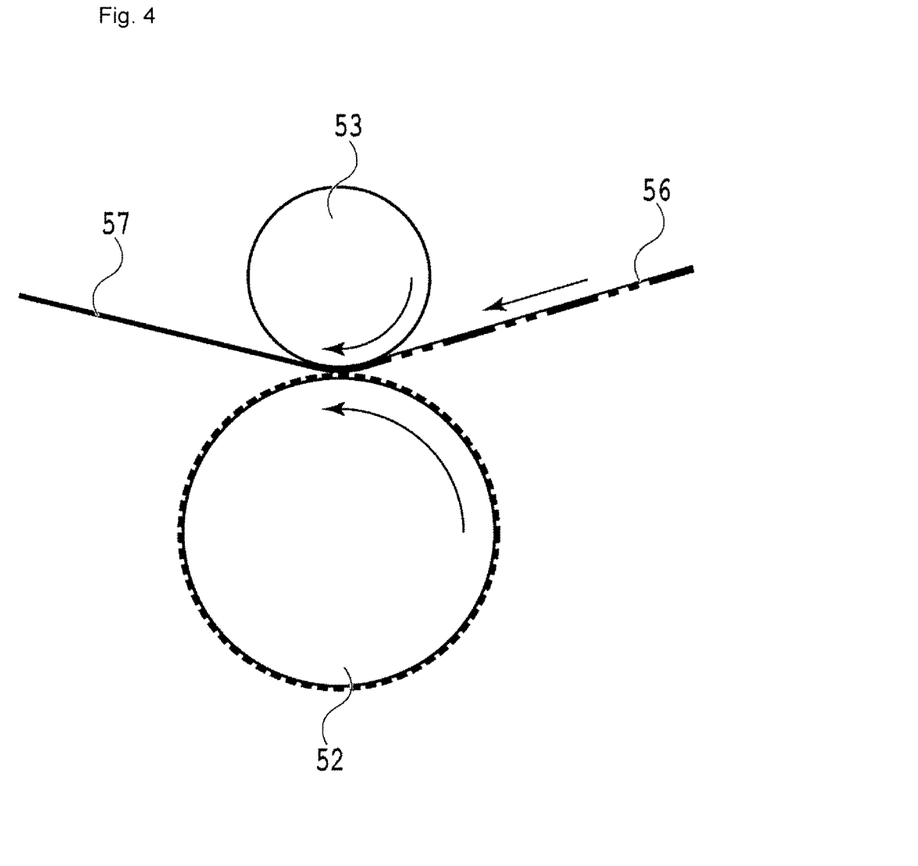
FIG. 4 is a schematic cross sectional view of an essential part of FIG. 3.

In FIG. 3, the forming film 56 for forming the fine relief structure may be a plastic film such as PET (polyethylene terephthalate), PEN (polyethylene naphthalate), PP (polypropylene) having a resin layer on which the mold structure is formed by a known technique such as "press method," "casting method," and "photopolymer method." Further, in the present invention, since the resin layer on which the mold structure is formed is used only for forming by the forming resin ink, and metals are not applied by vapor deposition or the like, a mold release treatment may be applied to the resin layer, for example, by adding silicone compound, fluorine compound, inorganic filler or the like so as to improve mold releasability. The resin layer on which the mold structure is formed may be made of a material which does not have a need of adhesion to metals.

(Ink Curing Section)

In FIG. 3, the forming resin ink curing section 58 and the bonding ink curing section 68 may be, for example, an oven which uses heat and air-flow, a UV or EB irradiation device or the like.

(Bonding Ink)

The bonding ink may be, for example, a laminate agent, or a resin material which loses adhesiveness when curing by UV or EB radiation.

In the aforementioned laminated transfer medium according to an embodiment, since the fine relief structure section is made up of separate discrete pieces positioned to be contained in area to be transferred by using a hot stamp, the laminated transfer medium can be provided with good breakability without being effected by a heat resistance or breakability such as hardness of the resin used for the fine relief structure section so as to prevent occurrence of transfer burrs or transfer defect in the fine relief structure section during thermal transfer. Further, since the fine relief structure section 4 is covered by the adhesive layer 6, the fine relief structure section 4 can improve impact resistance.

Figure 5:
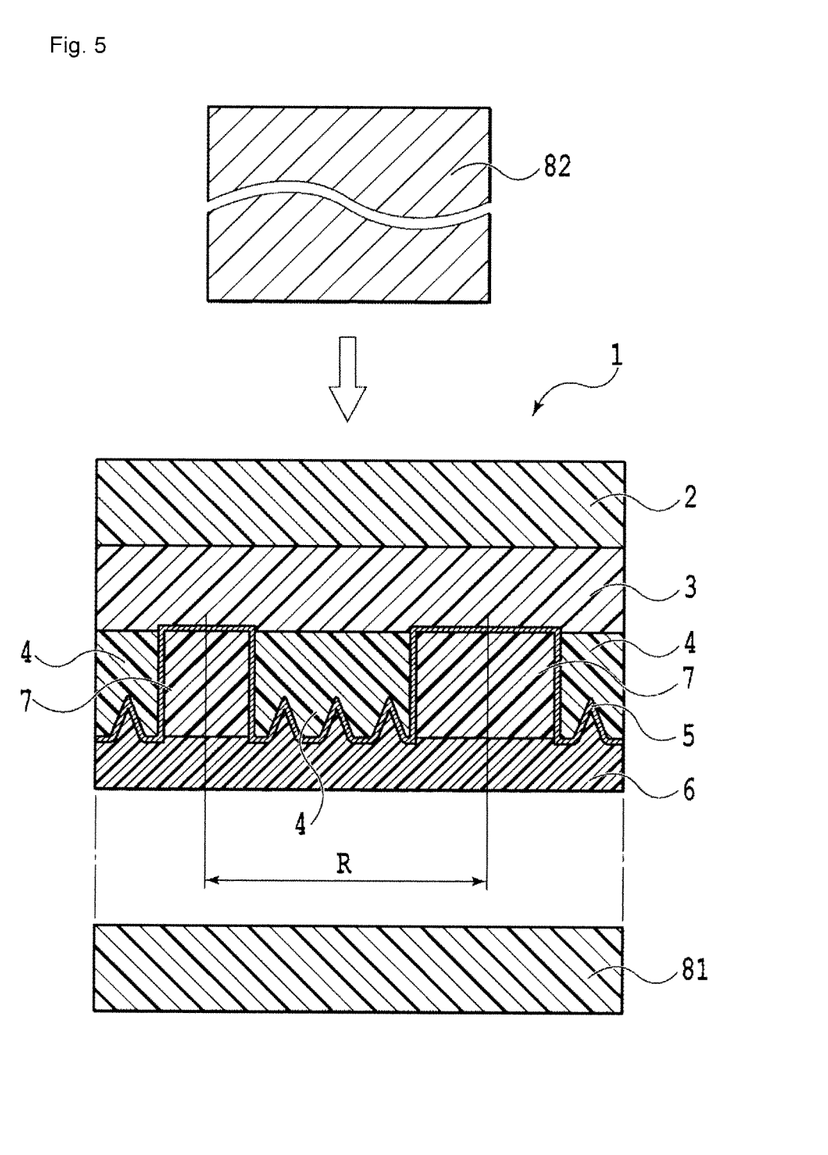
FIG. 5 is a schematic cross sectional view for explaining an operation of the laminated transfer medium according to an embodiment.

With reference to FIG. 5, an operation of the laminated transfer medium will be described.

As described above, the laminated transfer medium 1 includes the carrier base 2, the bonding layer 3, the fine relief structure section 4 made up of separate discrete pieces positioned to be contained in area to be transferred by using a hot stamp, the reflection layer 5 and the adhesive layer 6, which are stacked on the carrier base 2 in this order. In thermal transfer of the transfer laminate which includes the fine relief structure section 4 having fine relief shape onto a transfer target (for example, paper) 81 by using the laminated transfer medium 1, a hot stamp 82 shown in FIG. 5 is pressed against the carrier base 2. The pressing surface (underside) of the hot stamp 82 corresponds to area to be transferred. The area to be transferred has a width (for example, diameter)R, and the fine relief structure section 4 is included in the area to be transferred. As a result, the outer periphery of the area to be transferred is located inside the filling section 7 which surrounds the fine relief structure section 4 and is not overlapped with the outer periphery of the fine relief structure section 4. Accordingly, transfer burrs or transfer defect can be prevented from directly occurring to the fine relief structure section 4 during thermal transfer.

Figure 6A:
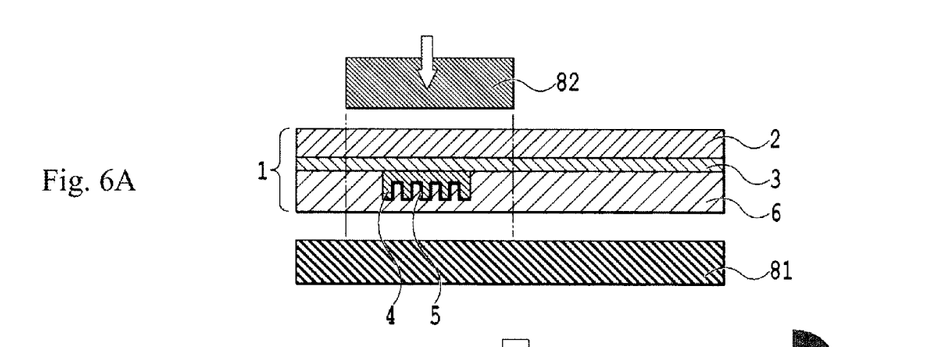
FIGS. 6A-6C are a schematic cross sectional view for explaining transfer by using the laminated transfer medium according to an embodiment.
Figure 6B:
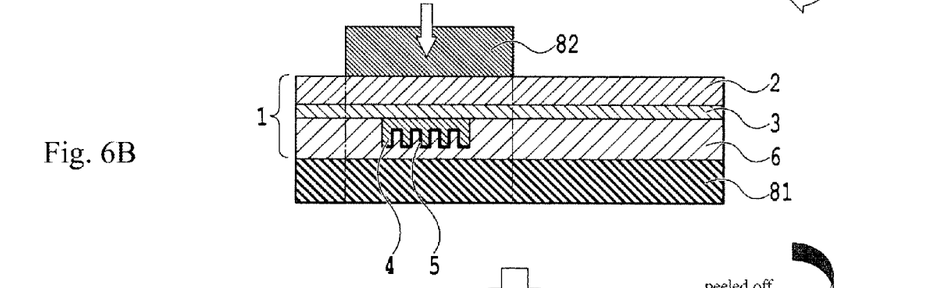
Figure 6C:
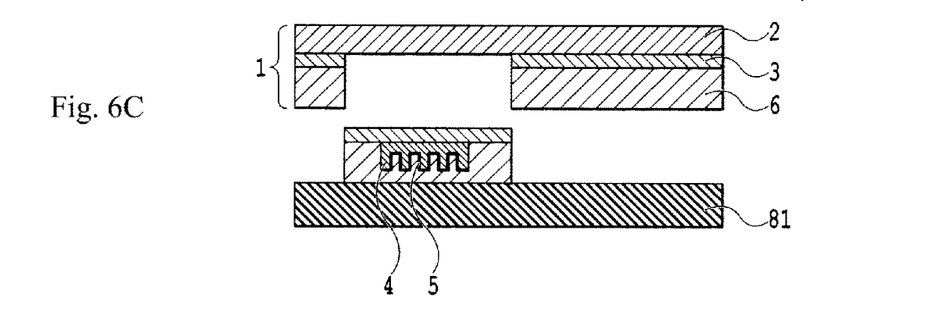

FIGS. 6A-6C show details of prevention of occurrence of transfer burrs or transfer defect. That is, in FIGS. 6A-6C, the area in the conventional laminated transfer medium 101 which is shown by A' in FIGS. 8A-8C does not exist.

Accordingly, the printed matters formed of the transfer laminate that contains the fine relief structure section can be formed on the transfer target with a high non-defective rate.

Further, according to the laminated transfer medium of an embodiment, it is possible to transfer the pattern including the fine relief structure section made by forming a resin, which has been difficult due to softening temperature or adhesiveness to metals by any of "press method," "casting method," and "photopolymer method" can be transferred on the transfer target.

According to the laminated transfer medium of an embodiment, the pattern which includes the fine relief structure section made by forming a resin which contains metals, silicon dioxide, magnetic material, inorganic metal oxide, liquid crystal or the like can be transferred on the transfer target.

With reference to FIG. 3, examples of the present invention will be described.

Example 1

Urethane-based resin was applied on a PET base material and dried to prepare the forming film 56 by a "press method." The forming film 56 was unwound from the forming film feed roll 51. Polyamideimide-based resin as the forming resin ink 55 for forming the fine relief structure section was filled in the forming resin ink container 54. The forming resin ink applying cylinder 52 on which a pattern was formed was aligned with the forming film 56 and pressed against the forming film 56 by using the forming resin ink pressurizing cylinder 53 so as to transfer the forming resin ink 55 onto the forming film 56. A hot-air oven is used for the forming resin ink curing section 58 to dry the forming resin ink 55.

The bonding film 66 was made of a PET base material on which a peeling layer made of acryl-based resin was applied. The bonding film 66 was unwound from the bonding film feed roll 61. Acryl-based adhesive resin as the bonding ink 65 was filled in the bonding ink container 64. The bonding ink applying cylinder 62 was pressed against the bonding film 66 by using the bonding ink pressurizing cylinder 63 so as to transfer the bonding ink 65 onto the bonding film 66. A hot-air oven is used for the bonding ink curing section 68 to dry the bonding ink 65.

The fine relief structure section-forming forming film 57 and the bonding ink layer-forming bonding film 67 were pressed together to be joined to each other at the contact point between the forming film bonding cylinder 59 and the bonding film bonding cylinder 69. The fine relief structure was transferred to the bonding film. The forming film 56 and the bonding film 66 were separated at the film peeling section 71. The bonding film on which the fine relief structure section was formed was wound around the bonding film take-up roll 70. Meanwhile, the forming film 56 separated from the fine relief structure section was wound around the forming film take-up roll 60.

Then, aluminum metal was vapor deposited on the bonding film 66 on which the fine relief structure section was formed in the thickness of 550 Å to form a reflection layer. After that, a mask layer made of polyamideimide-based resin was applied on part of the surface of the reflection layer 5 as desired. Then, the reflection layer was selectively etched by immersing in sodium hydroxide solution to form a patterned reflection layer. After the etching, the bonding film 66 was washed by hydrochloric acid solution and water, and then dried. Then, the bonding film 66 was coated with the adhesive layer 6 made of acryl-based resin so that the laminated transfer medium 1 which includes the fine relief structure section having discrete shapes spaced from one another was manufactured as shown in FIG. 2.

The manufactured laminated transfer medium was transferred onto cotton paper by thermocompression by using an up-down type thermal transfer apparatus having a hot stamp, and then, the bonding film 66 was peeled off.

Since the fine relief structure section was contained in the cotton paper and the outer periphery of the area to be transferred was located surrounding the fine relief structure section and not overlapped with the outer periphery of the fine relief structure section, the transfer laminate which contains the fine relief structure section was thermally transferred without burrs onto the cotton paper.

After that, a heat resistance test was conducted by applying an iron at 200° C. for 30 minutes onto the transfer laminate which contains the relief forming layer, which was the fine relief structure section on the cotton paper. As a result, the relief forming layer made of polyamideimide-based resin was not altered in quality, discolored or peeled off, and the fine relief structure remained unchanged.

Comparative Example 1-1

Urethane-based resin was applied on the surface of a peeling layer of PET base material to form the fine relief structure layer by a "press method." Aluminum was vapor deposited on the fine relief structure layer to form a reflection layer. After that, a mask layer made of polyamideimide-based resin was applied at a desired position and dried. Then, the reflection layer was selectively etched by sodium hydroxide solution to form a patterned reflection layer. Subsequently, acryl resin-based additive is applied so that the laminated transfer medium which includes the fine relief structure section which was a continuously formed layer was manufactured.

The manufactured laminated transfer medium was transferred onto the cotton paper by thermocompression by using an up-down type thermal transfer machine having a hot stamp. The transfer laminate on which the burrs were formed was thermally transferred on the cotton paper.

After that, a heat resistance test was conducted by applying an iron at 200° C. for 30 minutes on the transfer laminate which contains the relief forming layer, which was the fine relief structure section. As a result, the relief forming layer made of urethane-based resin was discolored and became white, and the fine relief structure was deformed.

Comparative Example 1-2

The surface of a peeling layer of PET base material was coated with polyamideimide-based resin, and a "press method" was performed for forming. Since polyamideimide-based resin was a highly heat-resistant resin, the fine relief structure forming layer was not formed at a forming temperature below 200° C. Then, the "press method" was again performed at a forming temperature of 200° C. or more to form the fine relief structure forming layer on the polyamideimide-based resin. However, since the PET base material did not have enough heat resistance, it shrank and deformed. As a consequence, the fine relief structure forming layer was not formed in a stable manner.

Then, aluminum metal was vapor deposited on the surface of the fine relief structure forming layer in the thickness of 550 Å to form a reflection layer. After that, a mask layer made of polyamideimide-based resin was applied on part of the surface of the reflection layer as desired. Then, the reflection layer was selectively etched by immersing in the sodium hydroxide solution to form a patterned reflection layer. After the etching, the PET base material was washed by hydrochloric acid solution and water, and then dried by hot air. Then, the dried PET base material was coated with the adhesive layer made of acryl-based resin so that the laminated transfer medium which includes the fine relief structure section which was a continuously formed layer was manufactured.

The manufactured laminated transfer medium was thermally transferred onto the cotton paper by using an up-down type thermal transfer machine having a hot stamp. Since the fine relief structure forming layer was made of a hard polyamideimide-based resin, burrs were formed on the peripheral edge of the fine relief structure section of the transfer laminate.

Comparative Example 1-3

The laminated transfer medium was manufactured using the same material and the same method as those of Comparative example 1, except for that the fine relief forming layer was made of polyamideimide-based resin which is brittle and not highly flexible with Tg of 260° C. and rupture elongation of less than 10%, and the fine relief forming layer was formed on the entire surface of the forming film.

The manufactured laminated transfer medium has the fine relief forming layer formed on the entire surface thereof.

The manufactured laminated transfer medium was thermally transferred onto cotton paper by using an up-down type thermal transfer machine having a hot stamp. Since the fine relief structure forming layer was made of a hard and brittle polyamideimide-based resin, the fine relief structure section of the transfer laminate showed a cracking.

Example 2

Urethane-based resin was applied on a PET base material and dried to prepare the forming film 56 by a "press method." The forming film 56 was unwound from the forming film feed roll 51. Aluminum-containing acryl-based resin as the forming resin ink 55 for forming the fine relief structure section was filled in the forming resin ink container 54. The forming resin ink applying cylinder 52 on which a pattern was formed was aligned with the forming film 56 and pressed against the forming film 56 by using the forming resin ink pressurizing cylinder 53 so as to transfer the forming resin ink 55 onto the forming film 56. A hot-air oven is used for the forming resin ink curing section 58 to dry the forming resin ink 55.

The bonding film 66 was made of a PET base material on which a peeling layer made of acryl-based resin was applied. The bonding film 66 was unwound from the bonding film feed roll 61. Acryl-based adhesive resin as the bonding ink 65 was filled in the bonding ink container 64. The bonding ink applying cylinder 62 was pressed against the bonding film 66 by using the bonding ink pressurizing cylinder 63 so as to transfer the bonding ink 65 onto the bonding film 66. A hot-air oven is used for the bonding ink curing section 68 to dry the bonding ink 65.

The fine relief structure section-forming forming film 57 and the bonding ink layer-forming bonding film 67 were pressed together to be joined to each other at the contact point between the forming film bonding cylinder 59 and the bonding film bonding cylinder 69. The fine relief structure was transferred to the bonding film. The forming film 56 and the bonding film 66 were separated at the film peeling section 71. The bonding film on which the fine relief structure section was formed was wound around the bonding film take-up roll 70. Meanwhile, the forming film 56 separated from the fine relief structure section was wound around the forming film take-up roll 60.

Then, the surface of the bonding film 66 on which the fine relief structure section was formed was coated with the adhesive layer made of acryl-based resin so that the laminated transfer medium 1 which includes the fine relief structure section having discrete shapes spaced from one another was manufactured as shown in FIG. 1.

The manufactured laminated transfer medium was transferred onto the cotton paper by thermocompression by using an up-down type thermal transfer apparatus having a hot stamp, and then, the bonding film 66 was peeled off.

Since the fine relief structure section was contained on the cotton paper and the outer periphery of the area to be transferred was located surrounding the fine relief structure section and not overlapped with the outer periphery of the fine relief structure section, the transfer laminate which contains the fine relief structure section was thermally transferred without burrs onto the cotton paper.

Although a reflection layer was not formed by vapor deposition on the laminated transfer medium, it was confirmed that the fine relief structure section generated diffracted light due to aluminum contained in the fine relief structure section which served as a reflection layer.

Comparative Example 2

Aluminum-containing acryl-based resin similar to that of Example 2 was applied on the surface of a peeling layer of a PET base material, and a "press method" was performed for forming. Since aluminum-containing acryl-based resin was a highly rigid resin, the fine relief structure forming layer was not formed at a forming temperature below 200° C. Then, the "press method" was again performed at a forming temperature of 200° C. or more to form the fine relief structure forming layer on the aluminum-containing acryl-based resin. However, since the PET base material did not have enough heat resistance, it shrank and deformed. As a consequence, the fine relief structure forming layer was not formed in a stable manner.

Then, the surface of the PET base material on which the fine relief structure forming layer was formed was coated with the adhesive layer made of acryl-based resin so that the laminated transfer medium which includes the fine relief structure section which was a continuously formed layer was manufactured.

The manufactured laminated transfer medium was thermally transferred onto the cotton paper by using an up-down type thermal transfer machine having a hot stamp. Since the fine relief structure forming layer was made of a hard aluminum-containing acryl-based resin, the burrs were formed on the peripheral edge of the fine relief structure section of the transfer laminate.

Example 3

Urethane-based resin was applied on a PET base material and dried to prepare the forming film 56 by a "press method." The forming film 56 was unwound from the forming film feed roll 51. Melamine-based resin as the forming resin ink 55 for forming the fine relief structure section was filled in the forming resin ink container 54. The forming resin ink applying cylinder 52 on which a pattern was formed was aligned with the forming film 56 and pressed against the forming film 56 by using the forming resin ink pressurizing cylinder 53 so as to transfer the forming resin ink 55 onto the forming film 56. A hot-air oven is used for the forming resin ink curing section 58 to dry the forming resin ink 55.

The bonding film 66 was made of a PET base material on which a peeling layer made of acryl-based resin was applied. The bonding film 66 was unwound from the bonding film feed roll 61. Acryl-based adhesive resin as the bonding ink 65 was filled in the bonding ink container 64. The bonding ink applying cylinder 62 was pressed against the bonding film 66 by using the bonding ink pressurizing cylinder 63 so as to transfer the bonding ink 65 onto the bonding film 66. A hot-air oven is used for the bonding ink curing section 68 to dry the bonding ink 65.

The fine relief structure section-forming forming film 57 and the bonding ink layer-forming bonding film 67 were pressed together to be joined to each other at the contact point between the forming film bonding cylinder 59 and the bonding film bonding cylinder 69. The fine relief structure was transferred to the bonding film. The forming film 56 and the bonding film 66 were separated at the film peeling section 71. The bonding film on which the fine relief structure section was formed was wound around the bonding film take-up roll 70. Meanwhile, the forming film 56 separated from the fine relief structure section was wound around the forming film take-up roll 60.

Then, aluminum metal was vapor deposited on the surface of the bonding film 66 on which the fine relief structure section was formed in the thickness of 550 Å to form a reflection layer. After that, a mask layer made of polyamideimide-based resin was applied on part of the surface of the reflection layer 5 as desired. Then, the reflection layer was selectively etched by immersing in the sodium hydroxide solution to form a patterned reflection layer. After the etching, the bonding film 66 was washed by hydrochloric acid solution and water, and then dried. Then, the bonding film 66 was coated with the adhesive layer 6 made of acryl-based resin so that the laminated transfer medium 1 which includes the fine relief structure section having discrete shapes spaced from one another was manufactured as shown in FIG. 2.

The manufactured laminated transfer medium was transferred onto the cotton paper by thermocompression by using an up-down type thermal transfer apparatus having a hot stamp, and then, the bonding film 66 was peeled off.

Since the fine relief structure section was contained in the cotton paper and the outer periphery of the area to be transferred was located surrounding the fine relief structure section and not overlapped with the outer periphery of the fine relief structure section, the transfer laminate which contains the fine relief structure section was thermally transferred without burrs onto the cotton paper.

After that, a heat resistance test was conducted by applying an iron at 200° C. for 30 minutes on the transfer laminate which contains the relief forming layer, which is the fine relief structure section on the cotton paper. As a result, the relief forming layer made of melamine-based resin was not altered in quality, discolored or peeled off, and the fine relief structure remained unchanged.

Comparative Example 3

The surface of peeling layer of the PET base material was coated with melamine-based resin, and a "press method" was performed for forming. Since melamine-based resin was a high heat-resistant resin, the fine relief structure forming layer was not formed at a forming temperature below 300° C. Then, the "press method" was again performed at a forming temperature of 300° C. or more to form the fine relief structure forming layer on the melamine-based resin. However, since the PET base material did not have enough heat resistance, it shrank and deformed. As a consequence, the fine relief structure forming layer was not formed in a stable manner.

Then, aluminum metal was vapor deposited on the surface of the fine relief structure forming layer in the thickness of 550 Å to form a reflection layer. After that, a mask layer made of polyamideimide-based resin was applied on part of the surface of the reflection layer as desired. Then, the reflection layer was selectively etched by immersing in the sodium hydroxide solution to form a patterned reflection layer. After the etching, the PET base material was washed by hydrochloric acid solution and water, and then dried by hot air. Then, the dried PET base material was coated with the adhesive layer made of acryl-based resin so that the laminated transfer medium which includes the fine relief structure section which was a continuously formed layer was manufactured.

The manufactured laminated transfer medium was thermally transferred onto the cotton paper by using an up-down type thermal transfer machine having a hot stamp. Since the fine relief structure forming layer was made of a rigid and brittle melamine-based resin, burrs were formed on the peripheral edge of the fine relief structure section of the transfer laminate.

Example 4

Urethane-based resin was applied on a PET base material and dried to prepare the forming film 56 by a "press method." The forming film 56 was unwound from the forming film feed roll 51. Titanium dioxide-containing acryl-based resin as the forming resin ink 55 for forming the fine relief structure section was filled in the forming resin ink container 54. The forming resin ink applying cylinder 52 on which a pattern was formed was aligned with the forming film 56 and pressed against the forming film 56 by using the forming resin ink pressurizing cylinder 53 so as to transfer the forming resin ink 55 onto the forming film 56. A hot-air oven is used for the forming resin ink curing section 58 to dry the forming resin ink 55.

The bonding film 66 was made of a PET base material on which a peeling layer made of acryl-based resin was applied. The bonding film 66 was unwound from the bonding film feed roll 61. Acryl-based adhesive resin as the bonding ink 65 was filled in the bonding ink container 64. The bonding ink applying cylinder 62 was pressed against the bonding film 66 by using the bonding ink pressurizing cylinder 63 so as to transfer the bonding ink 65 onto the bonding film 66. A hot-air oven is used for the bonding ink curing section 68 to dry the bonding ink 65.

The fine relief structure section-forming forming film 57 and the bonding ink layer-forming bonding film 67 were pressed together to be joined to each other at the contact point between the forming film bonding cylinder 59 and the bonding film bonding cylinder 69. The fine relief structure was transferred to the bonding film. The forming film 56 and the bonding film 66 were separated at the film peeling section 71. The bonding film on which the fine relief structure section was formed was wound around the bonding film take-up roll 70. Meanwhile, the forming film 56 separated from the fine relief structure section was wound around the forming film take-up roll 60.

Then, the surface of the bonding film 66 on which the fine relief structure section was formed was coated with the adhesive layer made of acryl-based resin so that the laminated transfer medium 1 which includes the fine relief structure section having discrete shapes spaced from one another was manufactured as shown in FIG. 1.

The manufactured laminated transfer medium was transferred onto the cotton paper by thermocompression by using an up-down type thermal transfer apparatus having a hot stamp, and then, the bonding film 66 was peeled off.

Since the fine relief structure section was contained in the cotton paper and the outer periphery of the area to be transferred was located surrounding the fine relief structure section and not overlapped with the outer periphery of the fine relief structure section, the transfer laminate which contains the fine relief structure section was thermally transferred without burrs onto the cotton paper.

Although a reflection layer was not formed by vapor deposition on the laminated transfer medium, it was confirmed that the fine relief structure section generated diffracted light due to titanium dioxide contained in the fine relief structure section which served as a reflection layer.

Comparative Example 4

The surface of a peeling layer of PET base material was coated with titanium dioxide-containing acryl-based resin as similar to that of Example 2, and a "press method" was performed for forming. Since the titanium dioxide-containing acryl-based resin was a highly rigid resin, the fine relief structure forming layer was not formed at a forming temperature below 200° C. Then, the "press method" was again performed at a forming temperature of 200° C. or more to form the fine relief structure forming layer on the titanium dioxide-containing acryl-based resin. However, since the PET base material did not have enough heat resistance, it shrank and deformed. As a consequence, the fine relief structure forming layer was not formed in a stable manner.

Then, the surface of the PET base material on which the fine relief structure forming layer was formed was coated with the adhesive layer made of acryl-based resin so that the laminated transfer medium was manufactured.

The manufactured laminated transfer medium was thermally transferred onto the cotton paper by using an up-down type thermal transfer machine having a hot stamp. Since the fine relief structure forming layer was made of a hard titanium dioxide-containing acryl-based resin, burrs were formed on the peripheral edge of the fine relief structure section of the transfer laminate.

While the details of components have been described referring to examples, modifications can be made depending on the purpose of application, for example, applying a print on the surface or between layers, or applying overcoat to reduce the irregularity between certain layers disposed in a patterned shape. Further, considering adhesiveness between layers, modifications can also be made, for example, providing adhesion anchor layer, and applying various adhesion promotion process such as corona discharge treatment or frame treatment.

INDUSTRIAL APPLICABILITY

The present invention can provide a laminated transfer medium which includes a fine relief structure section that may be used for a back light, diffusing plate or anti-reflection film for a Fresnel lens plate, lenticular plate and liquid crystal device used for a relief hologram, grating, sub-wavelength grating, microlens, polarizer, screen and the like with a material which is difficult to form by a "press method," "casting method" or "photopolymer method" to be contained in area to be transferred.

Further, according to the laminated transfer medium of the present invention, a variety of printed matters which have a transfer laminate which contains a fine relief structure section that can be thermally transferred onto a transfer target by using a hot stamp without occurrence of burrs and which are useful in various industries can be provided with a high non-defective rate and used as a fine relief structure for industrial use.

REFERENCE SIGNS LIST

1 . . . laminated transfer medium, 2 . . . carrier base, 3 . . . bonding layer, 4 . . . fine relief structure section, 5 . . . reflection layer, 6 . . . adhesive layer, 7 . . . filling section, 8 . . . mask layer, 51 . . . forming film feed roll, 52 . . . forming resin ink applying cylinder, 53 . . . forming resin ink pressurizing cylinder, 54 . . . forming resin ink container, 55 . . . forming resin ink, 56 . . . forming film, 57 . . . fine relief structure section-forming forming film, 58 . . . forming resin ink curing section, 59 . . . forming film bonding cylinder, 60 . . . forming film take-up roll, 61 . . . bonding film feed roll, 62 . . . bonding ink applying cylinder, 63 . . . bonding ink pressurizing cylinder, 64 . . . bonding ink container, 65 . . . bonding ink, 66 . . . bonding film, 67 . . . bonding ink layer-forming bonding film, 68 . . . bonding ink curing section, 69 . . . bonding film bonding cylinder, 70 . . . bonding film take-up roll, 71 . . . film peeling section, 81 . . . transfer target, 82 . . . hot stamp, 101 . . . laminated transfer medium, 102 . . . carrier base, 103 . . . bonding layer, 104 . . . fine relief structure forming layer, 105 . . . reflection layer, 106 . . . adhesive layer.

What is claimed is:

1. A laminated transfer medium that forms a transfer laminate which contains a fine relief structure section having a fine relief shape onto a transfer target by using a hot stamp, the laminated transfer medium comprising:
    a carrier base;
    a bonding layer formed on the carrier base;
    the fine relief structure section having the fine relief shape being disposed on the bonding layer;
    an adhesive layer formed on the fine relief structure section, wherein the fine relief structure section is made up of separate discrete pieces positioned to be contained in an area to be transferred by using the hot stamp, thereby transferring the fine relief shape; and
    a filling section that is formed between the discrete pieces of the fine relief structure section,
    wherein the filling section is made of a same material as the adhesive layer, and
    wherein the fine relief structure section is made of a resin material containing metal particles.

2. The laminated transfer medium of claim 1, wherein the adhesive layer is made of a soft resin, and the soft resin has an elongation ratio of 5% or more in a test method under ISO 527 using an ISO test piece (100 μm thickness).

3. The laminated transfer medium of claim 1, wherein the fine relief structure section is made of a heat resistant resin material having a glass transition temperature of 200° C. or more.

4. The laminated transfer medium of claim 1, wherein the fine relief structure section is made of a resin material containing an organic nitrogen compound.

5. A printed matter comprising a transfer laminate which contains the fine relief structure section having the fine relief shape, wherein
    at least the fine relief structure section in the transfer laminate is formed by being transferred from the laminated transfer medium according to claim 1 onto the transfer target by using a hot stamp, and
    the fine relief structure section is contained in the area transferred by using the hot stamp.

6. A laminated transfer medium that forms a transfer laminate which contains a fine relief structure section having a fine relief shape onto a transfer target by using a hot stamp, the laminated transfer medium comprising:
    a carrier base;
    a bonding layer formed on the carrier base;
    the fine relief structure section having the fine relief shape being disposed on the bonding layer;
    an adhesive layer formed on the fine relief structure section, wherein the fine relief structure section is made up of separate discrete pieces positioned to be contained in an area to be transferred by using the hot stamp, thereby transferring the fine relief shape; and
    a filling section that is formed between the discrete pieces of the fine relief structure section,
    wherein the filling section is made of a same material as the adhesive layer, and
    wherein the adhesive layer is made of a soft resin, and the soft resin has an elongation ratio of 5% or more in a test method under ISO 527 using an ISO test piece (100 μm thickness).

7. A laminated transfer medium that forms a transfer laminate which contains a fine relief structure section having a fine relief shape onto a transfer target by using a hot stamp, the laminated transfer medium comprising:
    a carrier base;
    a bonding layer formed on the carrier base;
    the fine relief structure section having the fine relief shape being disposed on the bonding layer;
    an adhesive layer formed on the fine relief structure section, wherein the fine relief structure section is made up of separate discrete pieces positioned to be contained in an area to be transferred by using the hot stamp, thereby transferring the fine relief shape; and
    a filling section that is formed between the discrete pieces of the fine relief structure section,
    wherein the filling section is made of a same material as the adhesive layer, and
    wherein the fine relief structure section is made of a resin material containing metal oxide particles.

* * * * *